United States Patent [19]
Walters

[11] Patent Number: 5,269,066
[45] Date of Patent: Dec. 14, 1993

[54] CARPENTERS LEVEL AND SQUARE

[76] Inventor: Christopher L. Walters, 620 W. 12th St., Juneau, Ak. 98801

[21] Appl. No.: 913,791

[22] Filed: Jul. 16, 1992

[51] Int. Cl.⁵ .............................. B43L 7/00; G01C 9/00
[52] U.S. Cl. .......................................... 33/451; 33/476; 33/377
[58] Field of Search ............... 33/451, 429, 474, 476, 33/479, 480, 377

[56] References Cited

U.S. PATENT DOCUMENTS

| | | | |
|---|---|---|---|
| 257,515 | 5/1882 | Pope | 33/426 |
| 613,946 | 11/1898 | Starrett | 33/451 |
| 817,515 | 4/1906 | Polimeni | 33/350 |
| 2,584,917 | 2/1952 | Powell | 33/377 |

FOREIGN PATENT DOCUMENTS

| | | | |
|---|---|---|---|
| 332391 | 8/1903 | France | 33/377 |
| 545419 | 7/1956 | Italy | 33/377 |

Primary Examiner—Harry N. Haroian
Attorney, Agent, or Firm—Robert M. Sperry

[57] ABSTRACT

An improved hand tool comprising a generally L-shaped frame having two legs each formed with a pair of channels spaced apart by a central ridge, and having panels of transparent material, such as tempered glass or plastic, mounted in the channels with a quantity of a suitable liquid contained between the panels to define a level-indicating chamber extending substantially the entire length of each leg and having indicia positioned adjacent the ends of each of these chambers to provide information relating to incremental discrepancies.

11 Claims, 2 Drawing Sheets

CARPENTERS LEVEL AND SQUARE

BACKGROUND

1. Field of the Invention

This invention relates to hand tools and is particularly directed to a combination carpenters level and square.

2. Prior Art

In carpentry, it is customary to use a level to assure that a given structural member is truly plumb and level, after which a square is used to make certain that components attached to the first member are properly perpendicular to the first member. Usually, this is a two-step operation, in which the level is used first and, then, is set aside while the square is used. However, this requires that the carpenter purchase two tools. Furthermore, the first member sometimes will become dislocated while the exchange of tools is occurring, in which case, neither of the members will be correctly situated and the entire structure will be faulty. In order to overcome these problems, several combination level and square tools have been proposed heretofore. However, many of the prior art combination tools have been complex to construct and expensive to purchase. Furthermore, most of the prior art combination tools have provided levels as insets which are mounted in a square and which can become dislocated, if the tool is dropped, and will provide erroneous indications thereafter. Also, many of the level inserts of the prior art combination tools are small and difficult to read. Furthermore, while a level indicates whether or not a given member is plumb or level, it does not provide incremental information. Thus, a level may tell that a member is out of line, but it will not tell how far out of line the member is. Consequently, the carpenter must rely upon trial-and-error to correctly align the errant member. Unfortunately, the prior art combination tools have done nothing to overcome this deficiency. A search in the United States Patent office has revealed the following:

| U.S. Pat. No. | INVENTOR | ISSUED |
| --- | --- | --- |
| 2,728,989 | C. J. Laggren | Jan. 3, 1956 |
| 4,700,489 | A. J. Vasile | Oct. 20, 1987 |
| 4,944,096 | S. D. Tolley | Jul. 31, 1990 |
| 4,964,219 | G. E. Clark | Oct. 23, 1990 |

Each of these references is subject to the deficiencies noted above. Thus, none of the prior art combination level and square tools have been entirely satisfactory.

BRIEF SUMMARY AND OBJECTS OF INVENTION

These disadvantages of prior art tools are overcome with the present invention and an improved hand tool is provided which combines the functions of both a level and a square in a single hand tool and which can be plainly and easily read and provides information regarding incremental discrepancies, in addition to providing a gross indication of lack of alignment.

These advantages of the present invention are preferably attained by providing a combination level and square comprising a generally L-shaped frame having two legs each formed with a pair of channels spaced apart by a central ridge, and having panels of transparent material, such as tempered glass or plastic, mounted in the channels with a quantity of a suitable liquid contained between the panels to define a level-indicating chamber extending substantially the entire length of each leg and having indicia positioned adjacent the ends of each of these chambers to provide information relating to incremental discrepancies.

Accordingly, it is an object of the present invention to provide an improved hand tool.

Another object of the present invention is to provide an improved hand tool which combines the functions of a level and a square into a single tool.

An additional object of the present invention is to provide an improved hand tool which combines the functions of a level and a square into a single tool, yet which is simple in construction and inexpensive to purchase.

A further object of the present invention is to provide an improved hand tool which has indicia to provide indications of incremental discrepancies.

A specific object of the present invention is to provide an improved hand tool comprising a generally L-shaped frame having two legs each formed with a pair of channels spaced apart by a central ridge, and having panels of transparent material, such as tempered glass or plastic, mounted in the channels with a quantity of a suitable liquid contained between the panels to define a level-indicating chamber extending substantially the entire length of each leg and having indicia positioned adjacent the ends of each of these chambers to provide information relating to incremental discrepancies.

These and other objects and features of the present invention will be apparent from the following detailed description, taken with reference to the figures of the accompanying drawing.

DETAILED DESCRIPTION OF THE INVENTION

Figure 1:
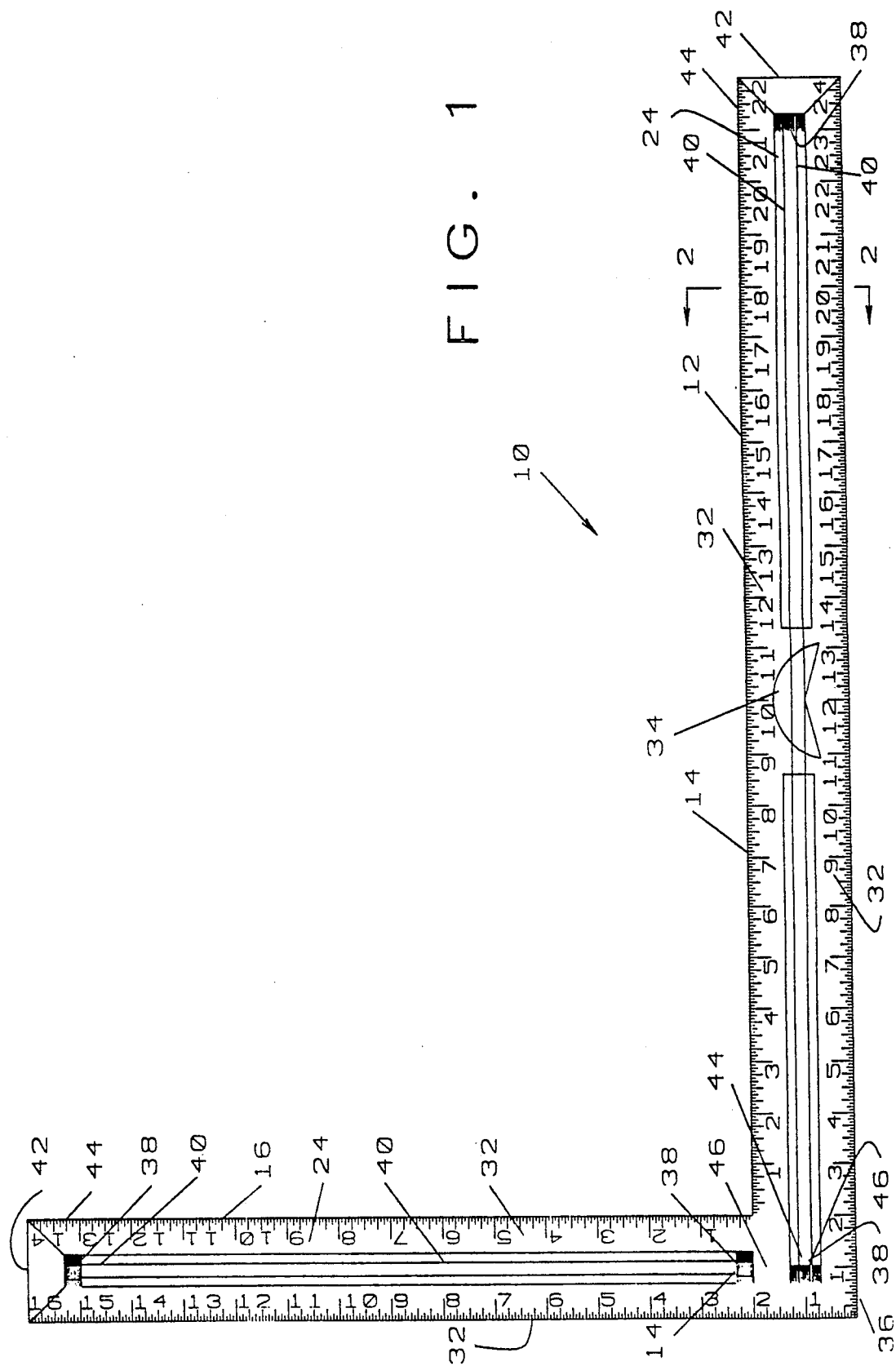
FIG. 1 is a side view of a hand tool embodying the present invention.
Figure 2:
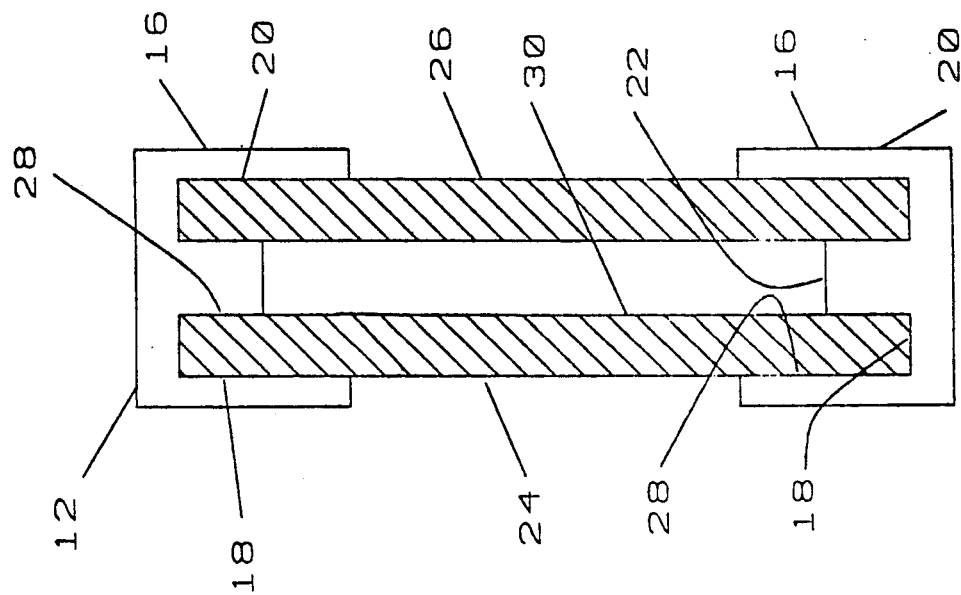
FIG. 2 is a transverse section through the tool of FIG. 1, taken on the line 2—2 thereof.

In that form of the present invention chosen for purposes of illustration in the drawing, FIG. 1 shows a combination carpenter's level and square, indicated generally at 10 comprising a generally L-shaped frame 12 formed of rigid material and having a pair of perpendicular legs 14 and 16. As best seen in FIG. 2, each of the legs 14 and 16 is formed with a pair of parallel channels 18 and 20 separated by a central divider 22. A pair of panels 24 and 26 are formed of transparent material and are each seated in a respective one of the channels 18 and 20 and sealed thereto by suitable sealing means 28 to retain a quantity of liquid 30 between the panels 24 and 26 and between the upper and lower dividers 22. Preferably, suitable indicia 32 are provided along the edges of the legs 14 and 16 to facilitate measurement. The intersection 36 of the legs 14 and 16 is formed with a solid plug 46 filling the space between the dividers 24 to prevent the liquid 30 of leg 14 from passing into leg 16 and vice versa. Moreover, if desired, a protractor scale 34, may be provided on the frame 12 adjacent the intersection 36. Finally, indicia are provided in a plurality of parallel rows 38 extending across the panels 24 and 26 perpendicular to the axis of the legs 14 and 16 and adjacent each end of legs 14 ans 16, while a central indicia 40 extends the entire length of each of the legs 14 and 16, to indicate incremental differences from true level. As best seen in FIG. 1, end caps 42 may be provided on the outer ends 44 of legs 14 and 16 to close the ends 44 of the legs 14 and 16 and to retain the liquid 30 within the frame 12.

In use, the tool 10 may be used as a carpenter's level by placing one leg, for example leg 14, of frame 12 in contact with and extending along a structural component, not shown, which is to be tested for level or plumb. To test the levelness of the structural component, the user observes the surface position of the liquid 30 within leg 14 of the frame 12 with respect to the central indicia 40 and the indicia rows 38 adjacent the respective ends of leg 14. If the structural component is truly level, the surface of the liquid 30 will lie adjacent the central one 40 of the indicia 38 adjacent both ends of leg 14. If the structural component is not truly level, the surface of the liquid 30 will lie above the central indicia 40 adjacent one of the indicia 38 adjacent one end, for example end 44, of leg 14; while the surface of the liquid 30 will lie below the central one 40 of the indicia 38 adjacent the end of leg 14 closest to the intersection 36. The number of the indicia 38 above or below the central indicia 40 will provide an indication of the incremental difference from true level. Similarly, to measure whether or not the structural component is in plumb, the user places one leg, for example leg 14, in contact with and extending along the structural component with leg 16 of the tool 10 extending perpendicular to the structural component. To determine whether or not the structural component is plumb, the user reads the position of the surface of the liquid 30 in leg 16 and, again, compares the position of the surface of the liquid 30 with the central one 40 of the indicia 38 adjacent each end of leg 16. If the surface of the liquid 30 does not lie adjacent the central one 40 of the indicia 38 adjacent both ends of leg 16, this tells the user that the structural component is not truly plumb and the number of indicia 38 above or below the central one 40 at each end of leg 16 will indicate the incremental amount by which the structural component is out of plumb and in which direction.

Figure 3:
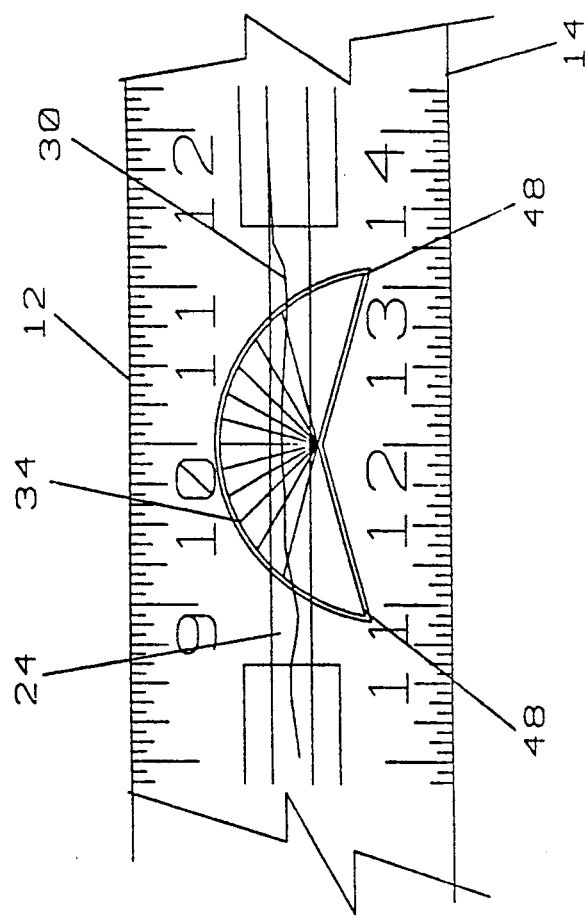
FIG. 3 is an enlarged detail view showing the intersection of an alternative form of the tool of FIG. 1.

FIG. 3 shows a detail of an alternative form of the tool 10 of FIG. 1. In this form of the present invention, the protractor scale 36 is located centrally of at least one of the arms 14 or 16 and is expanded to extend more than the 180° between central indicia 40 on either side of the protractor scale 36, as seen at 48. In this way, the surface of the liquid 30 in the horizontal leg, leg 14 as shown in FIG. 3, will lie adjacent the protractor scale 36 and will indicate any incremental discrepancy in degrees on the protractor scale 36.

Obviously, numerous other variations and modifications may be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A combination carpenter level and square comprising:
   a generally L-shaped frame having two legs each formed with a pair of channels spaced apart by a central ridge,
   a panel of transparent material mounted in each of said channels,
   a quantity of liquid contained between said panels to define level-indicating chambers extending substantially the entire length of each leg, and
   indicia positioned adjacent the ends of each of said chambers to provide information relating to incremental discrepancies from level of the liquid in the respective chamber.

2. The device of claim 1 further comprising:
   indicia extending along the edges of each of said legs to facilitate measurement along said leg.

3. The device of claim 1 further comprising:
   a solid plug sealing the space between said panels adjacent the intersection of said legs.

4. The device of claim 1 further comprising:
   a protractor scale carried by said frame adjacent the center of at least one of said legs.

5. The device of claim 1 further comprising:
   end caps closing the outer ends of each of said legs.

6. The device of claim 1 wherein:
   said transparent panels extend substantially the entire length of said legs.

7. The device of claim 1 wherein:
   said indicia are disposed in rows extending perpendicularly across said panels and lying parallel to the axis of said legs.

8. The device of claim 1 further comprising:
   a central indicia extending substantially the full length of at least one of said legs.

9. The device of claim 1 wherein:
   a protractor scale is located at the center of at least one of said legs.

10. The device of claim 8 wherein:
    a protractor scale is located at the center of said one of said legs.

11. The device of claim 10 wherein:
    said protractor scale extends more than the 180° beyond central indicia on either side of the protractor scale.

* * * * *